(12) United States Patent
Cartabbia

(10) Patent No.: US 12,296,524 B2
(45) Date of Patent: May 13, 2025

(54) APPARATUS AND PROCESS FOR THE THERMO-FORMING AND/OR THERMO-ADHESIVE BONDING OF SEMI-FINISHED PRODUCTS

(71) Applicants: MACPI S.P.A. PRESSING DIVISION, Palazzolo sull'Oglio (IT); ALTEXA S.R.L., Busto Arsizio (IT)

(72) Inventor: Giovanni Cartabbia, Palazzolo sull'Oglio (IT)

(73) Assignees: MACPI S.P.A. PRESSING DIVISION, Palazzolo sull'Oglio (IT); ALTEXA S.R.L., Busto Arsizio (IT)

( * ) Notice: Subject to any disclaimer, the term of this patent is extended or adjusted under 35 U.S.C. 154(b) by 55 days.

(21) Appl. No.: 17/628,277

(22) PCT Filed: Jul. 30, 2020

(86) PCT No.: PCT/IB2020/057184
§ 371 (c)(1),
(2) Date: Jan. 19, 2022

(87) PCT Pub. No.: WO2021/019481
PCT Pub. Date: Feb. 4, 2021

(65) Prior Publication Data
US 2022/0266501 A1     Aug. 25, 2022

(30) Foreign Application Priority Data
Jul. 31, 2019   (IT) .................. 102019000013536

(51) Int. Cl.
*B29C 51/42*     (2006.01)
*B29C 35/04*     (2006.01)
(Continued)

(52) U.S. Cl.
CPC .............. *B29C 51/42* (2013.01); *B29C 51/16* (2013.01); *B29C 51/261* (2013.01);
(Continued)

(58) Field of Classification Search
CPC ........ B29K 2105/0097; B29K 2105/24; A43B 23/0255; A43D 25/00; B29C 65/48; B29C 35/045; B29C 71/02; B29C 65/10
See application file for complete search history.

(56) References Cited

U.S. PATENT DOCUMENTS 3,614,388 A  * 10/1971  Robinson ................. A21B 1/26
                                                              219/400
4,490,927 A  *  1/1985  Kissell ................. B29C 70/504
                                                               34/634
(Continued)

FOREIGN PATENT DOCUMENTS

CN         101403573 A      4/2009
CN         101980624 A      2/2011
(Continued)

OTHER PUBLICATIONS

International Search Report and Written Opinion issued in Application No. PCT/IB2020/057184, dated Nov. 20, 2020.
Chinese Notification of the First Office Action and Search Report issued in corresponding Chinese Application No. 202080055839.9, dated Sep. 22, 2023.

*Primary Examiner* — Jacob T Minskey
*Assistant Examiner* — Elisa H Vera
(74) *Attorney, Agent, or Firm* — JONES ROBB, PLLC

(57) ABSTRACT

An apparatus for the thermo-forming and/or thermo-adhesive bonding of semi-finished products comprises: an oven (6) having walls (8, 9, 11, 12) delimiting a chamber (13) configured for housing at least one semi-finished product (4); devices (15, 16, 20) for generating a flow of heated fluid; wherein at least one of the walls (11) has a plurality of openings (19) in fluid communication with the devices (15,

(Continued)

16, 20). Baffles (23) and/or closing elements (24) are mounted near at least some of the openings (19). The baffles (23) are configured to divert the heated fluid leaving the openings (19). The closing elements (24) are configured to obstruct some of the openings (19). The baffles (23) and/or the closing elements (24) are movable with respect to the walls (11) and/or they are replaceable, in order to change conditions of the flow of heated fluid in the chamber (13).

16 Claims, 6 Drawing Sheets

(51) Int. Cl.
*B29C 51/16* (2006.01)
*B29C 51/26* (2006.01)
*B29K 101/12* (2006.01)
*B29K 105/00* (2006.01)
*B29K 105/24* (2006.01)
*B29L 31/48* (2006.01)

(52) U.S. Cl.
CPC ........ *B29C 35/045* (2013.01); *B29K 2101/12* (2013.01); *B29K 2105/0097* (2013.01); *B29K 2105/24* (2013.01); *B29L 2031/4864* (2013.01)

(56) References Cited

U.S. PATENT DOCUMENTS

| | | | | |
|---|---|---|---|---|
| 4,541,979 | A | * | 9/1985 | Cooke .................... B29C 55/22 |
| | | | | 425/114 |
| 4,580,853 | A | * | 4/1986 | Hitzeroth ............... A47B 77/02 |
| | | | | 248/327 |
| 2010/0018636 | A1 | * | 1/2010 | Ostani .................... B29C 49/24 |
| | | | | 156/423 |
| 2011/0005409 | A1 | | 1/2011 | Majchrzak |
| 2018/0045421 | A1 | | 2/2018 | Bailie |
| 2019/0329483 | A1 | * | 10/2019 | Bianconi ............ A43B 23/0255 |
| 2019/0351604 | A1 | * | 11/2019 | Chien .................. B29C 51/008 |
| 2020/0191434 | A1 | * | 6/2020 | Colehour .............. F24H 3/0411 |
| 2022/0174886 | A1 | * | 6/2022 | Kalinowski ............ A01G 9/025 |

FOREIGN PATENT DOCUMENTS

| | | |
|---|---|---|
| CN | 204054886 U | 12/2014 |
| CN | 206695522 U | 12/2017 |
| CN | 206989673 U | 2/2018 |
| CN | 208288379 U | 12/2018 |
| CN | 208504893 U | 2/2019 |
| GB | 1 395 711 A | 5/1975 |

\* cited by examiner

APPARATUS AND PROCESS FOR THE THERMO-FORMING AND/OR THERMO-ADHESIVE BONDING OF SEMI-FINISHED PRODUCTS

CROSS-REFERENCE TO RELATED APPLICATIONS

This application is a U.S. national stage application under 35 U.S.C. § 371 (c) of International Application No. PCT/IB2020/057184, filed on Jul. 30, 2020, which claims priority to Italian Patent Application No. 102019000013536, filed on Jul. 31, 2019, the entire content each of which is incorporated by reference herein in its entirety.

FIELD OF THE FINDING

The object of the present invention is an apparatus and a process for the thermo-forming and/or thermo-adhesive bonding of semi-finished products. In particular, the present invention relates to flexible semi-finished products aimed for attaining articles and/or accessories or parts thereof.

DEFINITIONS

In the present description and in the enclosed claims, with the term "flexible semi-finished product" it is intended a semi-finished product formed by threads and/or fibers of woven or nonwoven type or a sheet or a film obtained in another manner. A nonwoven fabric is a product similar to a woven fabric but obtained with processes different from weaving. By way of a non-exhaustive example, the semi-finished product is a fabric piece, a bag, a sock/stocking.

Among the articles/accessories attainable with the present invention, the following are included by way of a non-limiting example: clothing articles or parts thereof (e.g. gloves, socks/stockings, elements for jackets, pants, etc.), also of technical/sports type, medical articles (containment or orthopedic braces), accessories (bags, backpacks, trolleys, suitcases, etc.), coverings of various type, e.g. for furnishings or for vehicles, and socks/stockings of various type (also of sport or orthopedic type).

In the present description and in the enclosed claims, with the term "thermo-plastic or thermo-adhesive element" it is intended an element comprising thermoplastic polymers, i.e. polymers formed by linear chains or chains with few branches, not connected to each other. It is sufficient therefore to increase the temperature in order to bring them to a viscous state and hence be able to form them. Thermoplastic or thermos-adhesive elements have the capacity of modifying their own structure at a specific temperature (usually comprised between 60° C. and 180° C.), and hence melting once such temperature is reached and cross-linking once cooled. Examples of "thermo-plastic or thermo-adhesive" elements are yarns, layers, drops of thermo-plastic or thermo-adhesive material.

BACKGROUND OF THE FINDING

In such context, it is for example known to make gloves impermeable by coupling, via thermo-adhesive bonding, an impermeable film to an external portion of a previously formed glove.

For example, the document WO 2008/028913 illustrates a process for making gloves and similar articles which comprises the following operative steps: inserting a liner within the glove, in which glue is arranged between the glove and the liner; inserting a plug in the wrist zone of the glove provided with the liner; pumping a fluid in the liner in order to press it from the interior against the internal surface of the glove. In an embodiment illustrated in WO 2008/028913, the plug is provided with an inlet provided with a valve for maintaining the over-pressure in the glove. In this manner, the glove is arranged in an oven at a temperature higher than 80° C. in order to heat the glue and join the liner to the glove. After the glove is removed from the oven, further fluid is pumped within the liner so as to maintain it extended during the cooling.

The document WO 2008/015098 illustrates a process for waterproofing a semi-finished product of footwear, gloves, clothing articles and clothing accessories which comprises the following operative steps: arranging the semi-finished product between one or more air impermeable surfaces and a waterproofing sheet shaped for entirely or partially covering the surfaces to be waterproofed of the semi-finished product; generating reduced pressure between the waterproofing sheath and said air impermeable surfaces, in a manner such that the waterproofing sheath adheres to the semi-finished product by means of glue arranged between the surfaces to be waterproofed of the semi-finished product and the waterproofing sheath. In an embodiment illustrated in WO 2008/015098, the semi-finished product and the waterproofing sheath are arranged on a support and placed in an autoclave which exerts a further pressure.

The document U.S. Pat. No. 8,882,948 illustrates a device for making gloves in which an insert that is water-resistant and provided with thermoplastic adhesive is inserted in a glove and fixed to a support element. The insert is then made to expand by means of gas injection. The support element is fixed on a rotating table and made to transit through an oven of the device, in which hot air or infrared rays or electrical heating elements etc. transmit heat to the glove and to the insert in order to determine the gluing of the insert with the glove.

The document US 2018/045421 A1 is also known, which however illustrates a convection oven for cooking foods.

The document GB 1 395 711 A illustrates an apparatus which facilitates the evaporation of solvents from liquid compositions that contain said solvents and are applied to parts of footwear during the manufacturing thereof.

The applicant has observed that the processes and the apparatuses of known type, like those described above, can be improved with regard to several aspects, especially with regard to the quality of the portions subjected to thermo-forming and/or to thermo-adhesive bonding.

In particular, the applicant has observed that the processes and the apparatuses of known type are unable to bring the different parts of the semi-finished product to the temperatures and for the times necessary for the correct thermo-forming and/or thermo-adhesive bonding so as to obtain quality products.

The applicant has observed that often the temperature must be the same and that it must be maintained for the same time over the entire surface of the semi-finished product, such as in the case of the thermo-adhesive bonding of films or liners, e.g. impermeable, applied to gloves. The temperature and the time during which such temperature is maintained must be the same on the tips of the fingers, between the fingers themselves, on the palm and on the back of the glove, etc.

The applicant has observed that the apparatuses of known type are unable to ensure such uniformities, even if the semi-finished products are moved within the oven intended to heat them, as in the case of document U.S. Pat. No. 8,882,948.

SUMMARY

In such context, the applicant has therefore set as objective that of proposing an apparatus and a process for the thermo-forming and/or thermo-adhesive bonding of semi-finished products provided with thermo-plastic or thermo-adhesive elements which allow heating the different parts of the semi-finished product with the desired modes so as to obtain quality articles and/or accessories.

In particular, the applicant has set as objective that of proposing an apparatus and a process which allow uniformly heating the semi-finished products so as to obtain a quality thermo-adhesive bonding and/or a quality thermoforming.

The applicant has also set as objective that of proposing an apparatus that is flexible, i.e. adaptable to semi-finished products that are even very different from each other.

The applicant has also set as objective that of proposing an apparatus which can be configured in a simple and quick manner as a function of the type of semi-finished product being processed.

The applicant has also set as objective that of proposing a compact, structurally simple and reliable apparatus, also relatively inexpensive.

The applicant has found that the above-listed objects and still others can be substantially achieved by an apparatus and by a process for the thermoforming and/or thermo-adhesive bonding of semi-finished products configured for uniformly heating semi-finished products provided with the abovementioned thermo-plastic or thermo-adhesive elements, so as to cause the at least partial melting and the subsequent cross-linking of the thermoplastic polymers of said thermo-plastic or thermo-adhesive elements and therefore the desired thermo-forming and/or thermo-adhesive bonding.

In particular, the applicant has found that the above-listed objects and still others can be substantially reached by an apparatus and by a process for the thermo-forming and/or thermo-adhesive bonding of semi-finished products according to one or more of the enclosed claims and/or according to one or more of the following aspects.

More precisely, the applicant has found that the above-listed objects and still others can be substantially achieved by means of a ventilated oven provided with devices adapted to control/direct the fluid circulating therein.

According to an independent aspect, the present invention regards an apparatus for the thermo-forming and/or thermo-adhesive bonding of semi-finished products.

In one aspect, the apparatus comprises:
an oven having walls delimiting a chamber configured for housing at least one semi-finished product;
devices for generating a flow of heated fluid in the chamber;
wherein at least one of the walls has a plurality of openings in fluid communication with said devices;
baffles and/or closing elements mounted near at least some of the openings; wherein the baffles are configured to divert the heated fluid leaving the openings and/or wherein the closing elements are configured to obstruct some of said openings;
wherein the baffles and/or the closing elements are movable with respect to the walls and/or they are replaceable, in order to change conditions of the flow of heated fluid in the chamber.

According to an independent aspect, the present invention regards a process for the thermo-forming and/or thermo-adhesive bonding of semi-finished products carried out by means of the apparatus according to the preceding aspect or according to at least one of the following aspects.

Said process comprises:
selecting and mounting the baffles and/or the closing elements on said at least one of the walls as a function of a shape and/or size of a semi-finished product to be treated, wherein the semi-finished product comprises thermo-plastic and/or thermo-adhesive elements;
placing and maintaining the semi-finished product in the chamber;
introducing the heated fluid in the chamber through the openings in order to heat the semi-finished product, wherein the baffles and/or the closing elements are shaped and/or configured to uniformly distribute the fluid on the semi-finished product and to reach a same temperature and for a same time in all the zones of said semi-finished product;
making or letting the semi-finished product cool down;
wherein the heating and the subsequent cooling of the semi-finished product cause a modification of the thermo-plastic and/or thermo-adhesive elements and the thermo-forming and/or thermo-adhesive bonding.

The applicant has first of all verified that the apparatus and the process according to the invention allow producing quality articles by means of thermoforming and/or thermo-adhesive bonding of respective semi-finished products.

In particular, the applicant has verified that the apparatus and the process according to the invention allow bringing the various parts of the semi-finished product to the correct temperature(s) for the correct time(s) in order to obtain the desired thermo-forming and/or the desired thermo-adhesive bonding.

In particular, the applicant has verified that the apparatus and the process according to the invention allow directing the hot fluid where it is necessary so as to maintain a same temperature for the same time over the entire surface of the semi-finished product.

The applicant has also verified that the apparatus and the process according to the present invention can be configured as a function of the geometry/form and/or of the size of the semi-finished product to be treated, so as to always obtain the best results even with semi-finished products that are very different from each other.

The applicant has also verified that the apparatus is relatively simple and compact and can be configured in a simple and quick manner.

Further aspects of the present invention are listed hereinbelow.

In one aspect, opposite walls that face each other each has a plurality of openings, baffles and/or closing elements.

In one aspect, a plurality of coupling elements are provided, arranged on the walls, and wherein the baffles and/or the closing elements are hooked or hookable in a removable way to said coupling elements.

In one aspect, the baffles and/or the closing elements are interchangeable with each other.

In one aspect, baffles are provided which are different from each other and/or closing elements are provided which are different from each other.

In one aspect, the apparatus comprises a plurality of types of baffles and a plurality of types of closing elements.

In one aspect, each of the baffles comprises a plate projecting, when the baffle is associated with the respective wall, within the chamber.

In one aspect, each of the closing elements comprises a plate occluding, when the closing element is associated with the respective wall, at least one of the openings.

In one aspect, it is provided to select baffles of the same type or of different types and to mount them in the chamber as a function of the shape and/or of the size of the semi-finished product to be treated.

In one aspect, it is provided to select closing elements of the same type or of different types and to mount them in the chamber as a function of the shape and/or of the size of the semi-finished product to be treated.

In one aspect, the openings comprise a plurality of holes, optionally series of holes, each arranged on a respective horizontal line.

In one aspect, each of the coupling elements comprises a seat or a pocket configured for housing a portion of a baffle or of a closing element.

In one aspect, each pocket is extended parallel to the respective wall.

In one aspect, each pocket is arranged immediately below a respective series of holes.

In one aspect, the portion of the baffle or of the closing element is slidably insertable in the pocket or slidably removable from the pocket.

In one aspect, the portion of the baffle or of the closing element is manually insertable in the pocket or manually removable from the pocket.

In one aspect, each baffle is defined by a folded plate, in which the portion of the baffle intended to be inserted in the pocket and a portion projecting in the chamber are respective portions of said folded plate.

In one aspect, the projecting portion is flat or undulated.

In one aspect, the projecting portion has a rectilinear or irregular end edge.

In one aspect, the projecting portion is substantially perpendicular or it is bent with respect to the wall on which it is mounted.

In one aspect, each closing element is defined by a plate insertable in the pocket.

In one aspect, each closing element has a shaped edge configured for closing one or more holes when the closing element is housed in the respective pocket.

In one aspect, at least one of the walls is removable in order to allow access to the chamber and to operate on the baffles and/or on the closing elements.

In one aspect, when said at least one of the walls is removed, an operator is capable of accessing the chamber (by inserting his/her hands and possibly arms) and inserting or removing the baffles and/or the closing elements into/from the pockets.

In one aspect, a main framework configured for abutting against the ground supports the oven.

In one aspect, a support head is mounted on the main framework, optionally above the oven, and is configured for supporting a semi-finished product.

In one aspect, the support head is movable with respect to the main framework between a first position, optionally lifted, in which it maintains the semi-finished product outside of the chamber, and a second position, optionally lowered, in which it maintains the semi-finished product inside the chamber.

In one aspect, a motor or actuator mounted on the main framework and operatively connected to the support head is configured for moving the support head between the first and the second position.

In one aspect, one of the walls, optionally an upper wall, optionally the removable wall, has a passage and a door movable between a closed position of the passage and an open position of the passage.

In one aspect, an actuator is operatively connected to the door and is configured for moving it between the closed position and the open position.

In one aspect, the support head is configured for inserting the semi-finished product in the chamber through said passage when the door is in the open position.

In one aspect, the removable wall comprises a framework hookable to the oven and unhookable from the oven and delimiting said passage, in which the door is mounted on the framework.

In one aspect, the actuator is mounted on the framework.

In one aspect, the support head comprises a quick coupling device configured for being hooked to and unhooked from the semi-finished product.

In one aspect, when the support head is hooked to a semi-finished product, said semi-finished product is hung below the support head.

In one aspect, the support head comprises a cover configured for closing said passage when the door is in the open position and the support head is in the second position.

In one aspect, the semi-finished product is a flexible semi-finished product, optionally a glove or a sock/stocking having an open end.

In one aspect, the apparatus comprises a plug, wherein the open end of the flexible semi-finished product is fit or fittable on said plug, wherein the plug has a through duct through the plug and a quick coupling delimiting in part the duct and hookable in a removable way to the quick coupling device of the support head.

In one aspect, the quick coupling comprises a check valve.

In one aspect, the apparatus comprises a fixing ring configured for being arranged and closed around the open end of the semi-finished product when said open end is fit on the plug so as to retain the semi-finished product on said plug.

In one aspect, the apparatus comprises or is connected to a pressurized fluid source, wherein said pressurized fluid source is in fluid connection with the quick coupling device of the support head.

In one aspect, the pressurized fluid source is configured for introducing the pressurized fluid within the semi-finished product through the through duct and for generating an over-pressure (with respect to the ambient pressure) in the semi-finished product.

In one aspect, the oven comprises external walls arranged externally with respect to the walls delimiting the chamber, in which at least one interspace is delimited between the walls and the external walls.

In one aspect, the devices for generating the flow of heated fluid are operatively active in the interspace.

In one aspect, the devices for generating the flow of heated fluid introduce the fluid that is heated or to be heated in the interspace.

In one aspect, the devices for generating the flow of heated fluid comprise a motorized fan.

In one aspect, the motorized fan has a delivery facing the interspace and a suction facing the chamber in order to generate a recirculation of heated fluid.

In one aspect, the devices for generating the flow of heated fluid comprise electrical heating elements, optionally mounted in the interspace.

In one aspect, fluid in the chamber is suctioned by the suction of the motorized fan, is expelled by the motorized fan and introduced into the interspace, hits the electrical heating elements, being heated, and is newly introduced into the chamber through the openings.

In one aspect, the heated fluid is air, optionally ambient air, vapor or mixture of air and vapor.

In one aspect, the pressurized fluid is air.

In one aspect, when the semi-finished product is in the chamber and is hit by the heated fluid, said semi-finished product is fixed with respect to the walls of the oven.

In one aspect, it is provided to unhook the removable wall and to insert the baffles and/or the closing elements, selected as a function of the shape and/or of the size of the semi-finished product to be treated, in the pockets.

In one aspect, the flexible semi-finished product comprises a main portion and a liner or a film, optionally waterproof, associated with the main portion.

In one aspect, the thermoplastic or thermoadhesive elements are interposed between the liner or film and the main portion or they form part of the liner or film and/or of the main portion.

In one aspect, the thermoplastic or thermoadhesive elements comprise a layer or a plurality of points of adhesive interposed between the liner or film and the main portion.

In one aspect, it is provided to prepare the liner or the film and to associate it with the main portion, optionally temporarily jointing in some points.

In one aspect, it is provided to fit the open end of the flexible semi-finished product on the plug and to at least partially inflate and to maintain inflated, optionally by means of the check valve, the flexible semi-finished product arranged on the plug.

In one aspect, it is provided to connect the plug to the quick coupling device of the support head; wherein optionally the plug is hung on the quick coupling device.

In one aspect, it is provided to carry the flexible semi-finished product inside the chamber by moving the support head into the second position.

In one aspect, it is provided to activate the motorized fan and the electrical heating elements in order to circulate hot fluid in the chamber and start the working cycle.

In one aspect, it is provided to vary a temperature of the fluid in the chamber and/or the over-pressure in the flexible semi-finished product and/or a flow rate of the fluid in the chamber during the cycle.

In one aspect, it is provided to first heat and maintain the fluid at a pre-heating temperature $T_{preris}$ with a pre-heating over-pressure $P_{preris}$ for a pre-heating time $t_{preris}$.

In one aspect, it is then provided to heat and maintain the fluid at a heating temperature $T_{ris}$ with a heating over-pressure $p_{ris}$ for a heating time $t_{ris}$.

In one aspect, the heating temperature $T_{ris}$ is higher than the pre-heating temperature $T_{preris}$.

In one aspect, the heating over-pressure $p_{ris}$ is higher than the pre-heating over-pressure $p_{preris}$.

In one aspect, the heating time $t_{ris}$ is higher than the pre-heating time $t_{preris}$.

In one aspect, the pre-heating temperature $T_{preris}$ is comprised between 90 C.° and 200° C., optionally between 100° C. and 150° C.

In one aspect, the heating temperature $T_{ris}$ is comprised between 90 C.° and 200° C., optionally between 100° C. and 150° C.

In one aspect, the pre-heating over-pressure $P_{preris}$ is comprised between 0.005 bar and 1 bar, optionally between 0.01 bar and 0.05 bar.

In one aspect, the heating over-pressure $p_{ris}$ is comprised between 0.005 bar and 1 bar, optionally between 0.01 bar and 0.05 bar.

In one aspect, the pre-heating time $t_{preris}$ is comprised between 5 s and 30 s, optionally between 7 s and 15 s.

In one aspect, the heating time $t_{ris}$ is comprised between 5 s and 30 s, optionally between 7 s and 15 s.

In one aspect, it is provided to remove the flexible semi-finished product from the chamber by moving the support head into the first position.

In one aspect, it is provided to disconnect the plug from the quick coupling device of the support head.

In one aspect, it is provided to let the flexible semi-finished product cool while it is still arranged on the plug and inflated, optionally at ambient conditions, optionally in a support framework provided with quick coupling devices for the quick coupling of the plug.

Further characteristics and advantages will be clearer from the detailed description of a preferred but not exclusive embodiment of an apparatus and of a process for thermo-forming and/or thermo-adhesive bonding of semi-finished products in accordance with the present invention.

DESCRIPTION OF THE DRAWINGS

Such description will be set forth hereinbelow with reference to the enclosed drawings, provided only as a non-limiting example, in which.

DETAILED DESCRIPTION OF ONE EMBODIMENT OF THE INVENTION

Figure 1:
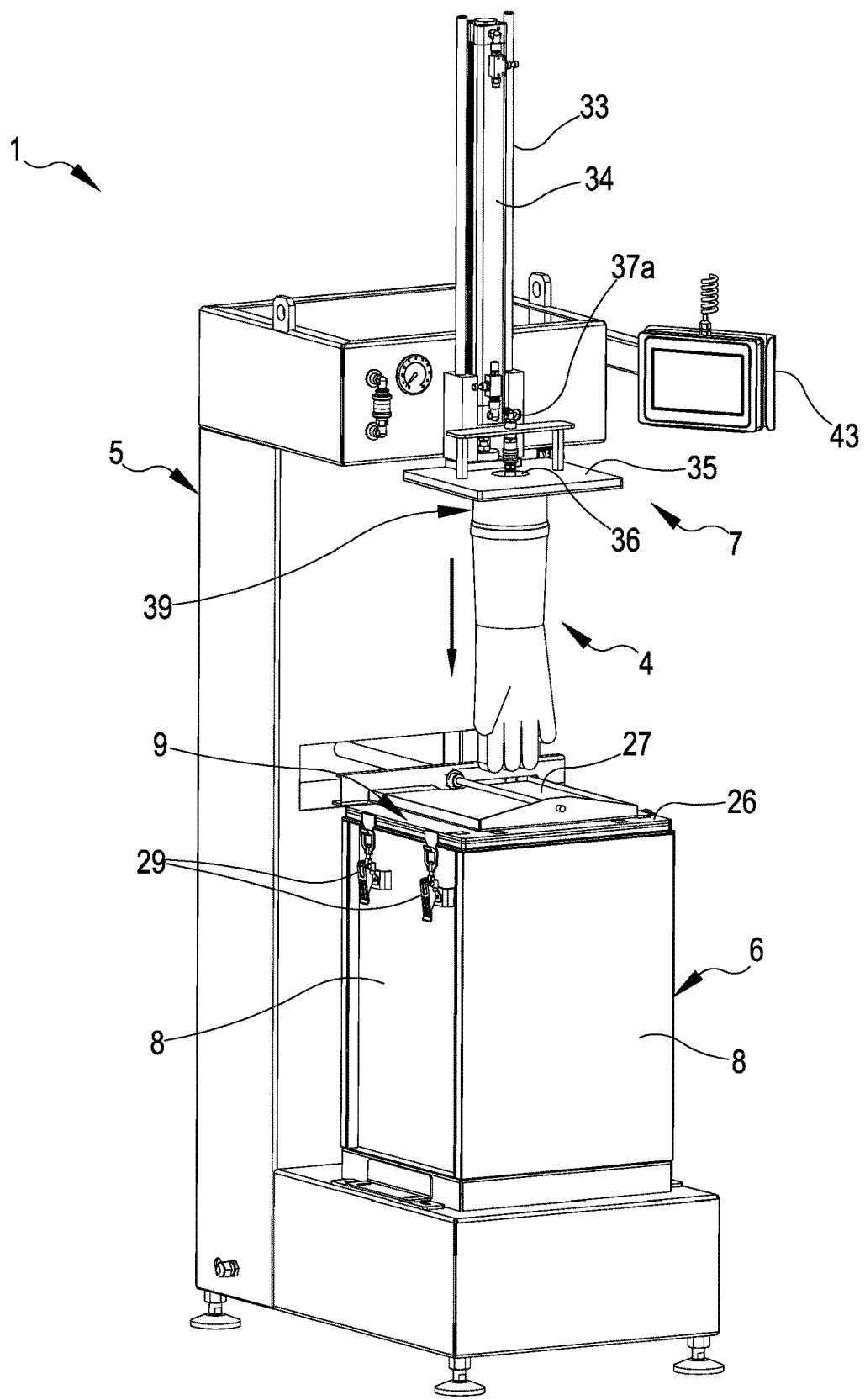
FIG. 1 illustrates an overall perspective view of an apparatus for the thermo-forming and/or thermo-adhesive bonding of semi-finished products according to the present invention.
Figure 7:
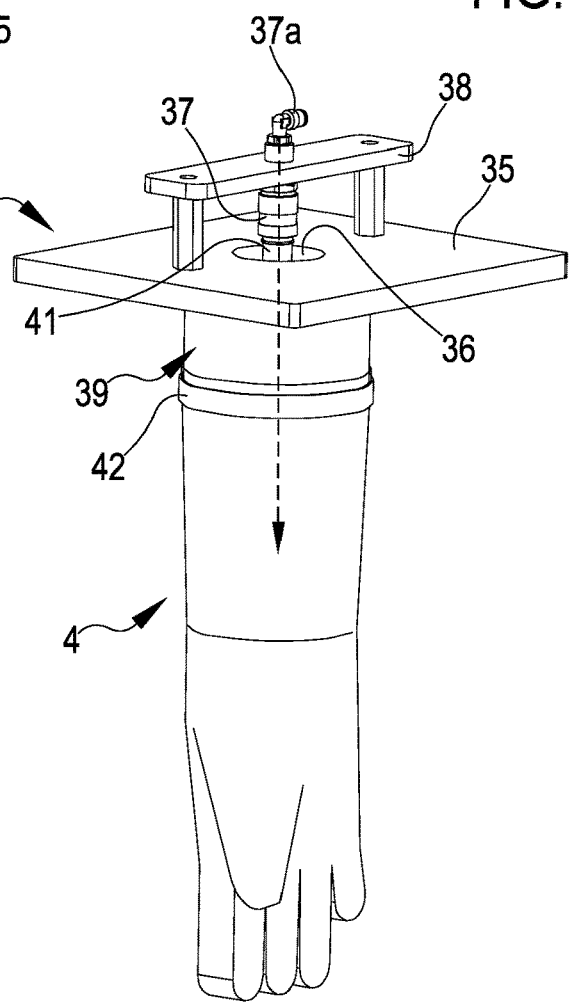
FIG. 7 illustrates the assembly of FIG. 6 associated with the glove.
Figure 8:
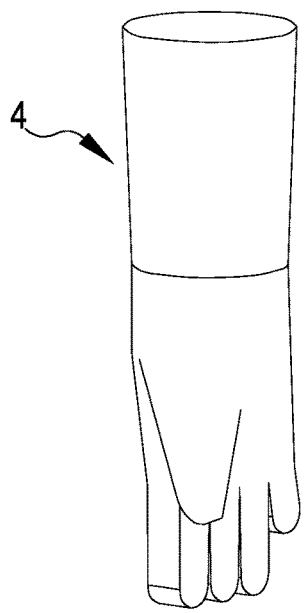
FIG. 8 schematically illustrates a glove in which an internal liner is visible.
Figure 8:
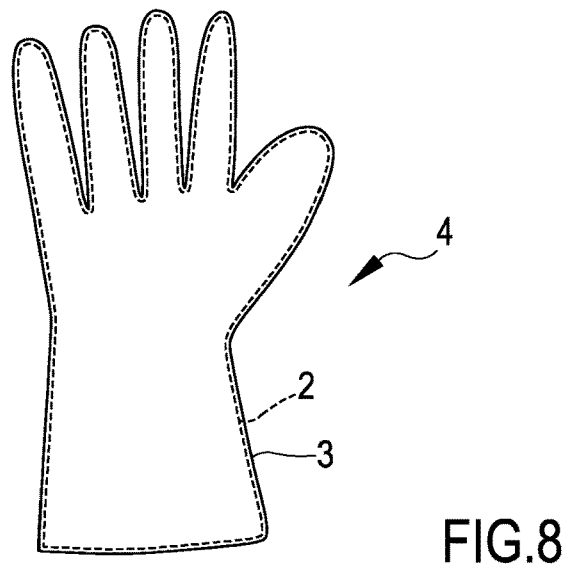

With reference to FIG. 1, reference number 1 overall indicates an apparatus for the thermo-forming and/or thermo-adhesive bonding of semi-finished products. In particular, the illustrated apparatus 1 performs the function of thermo-adhesive bonding an internal impermeable liner 2 to an external main portion 3 of a glove 4. The glove 4 is schematically illustrated in FIG. 7.

The apparatus 1 comprises a main framework 5 configured to rest on the ground. The main framework 5 supports an oven 6 abutted against a lower base of the main framework 5. A portion of the main framework 5 is extended upward up to above the oven 6 and carries a support head 7 configured for supporting the glove 4.

The oven 6 is of ventilated type and comprises a box-like container defined by four lateral external walls 8, by an upper wall 9 and by a lower external wall 10. The oven also comprises a pair of lateral internal walls 11 side-by-side and spaced from two of the lateral external walls 8, and a lower internal wall 12 spaced from the lower external wall 10. The lateral internal walls 11, the remaining two external lateral walls 8 and the lower internal wall 12 delimit a chamber 13 within them configured for housing the glove 4. The lateral external walls 8 and the lower external wall 10 delimit, together with the lateral internal walls 11 and to the lower internal wall 12, an interspace 14.

A fan 15, illustrated only schematically, is arranged between the lower external wall 10 and the lower internal wall 12 with a vertical rotation axis and is connected to a motor 16 which projects downward from the lower external wall 10. The lower internal wall 12 is a grid which allows the passage of air suctioned by the fan 15. Indeed, the fan 15 is configured in a manner such to have a radial delivery 17 and an axial suction 18, through the grid. The fan 15 suctions the air present in the chamber 13 through the grid and introduces it into the interspace 14.

Figure 3:
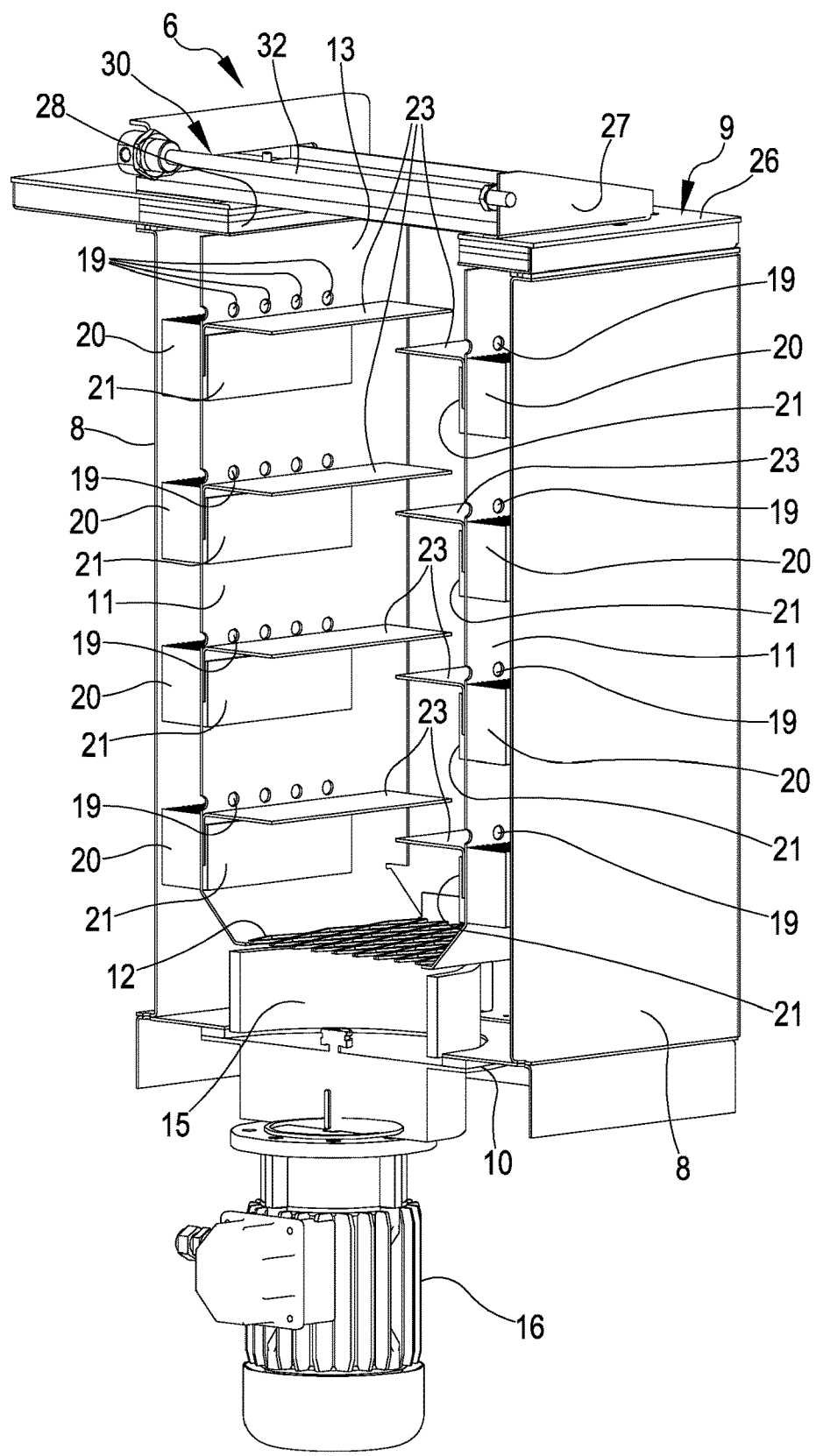
FIG. 3 is a sectioned perspective view of the oven of FIG. 2.

Each of the lateral internal walls 11 has rows of holes 19 (FIG. 3). Each row is aligned along a horizontal direction and the rows are vertically superimposed with respect to each other. The holes 19 place the chamber 13 in fluid communication with the interspace 14. Therefore, the air introduced into the interspace 14 by the fan 15 rises upward into the interspace 14, flows once again in the chamber 13 through the holes 19 and is made to recirculate in the oven 6.

Electrical heating elements 20 are mounted in the interspace 14 and are power supplied in order to heat the air that circulates in the oven 6. Each electrical heating element 20 is extended between the external wall 8 and the respective internal part 11 and is placed just below a row of holes 19. In the illustrated non-limiting embodiment, four rows of holes 19 are present for each of the two internal walls 11 and four electrical heating elements 20 are present that are associated with each of the two internal walls 11.

The fan 15 with the motor 16 and the electrical heating elements 20 define devices for generating a flow of heated fluid. In the illustrated example, such fluid is air.

On the faces of the lateral internal walls 11 directed towards the chamber 13 and just below each row of holes 19, coupling elements 21 are mounted, each defined by a lamina parallel to the respective wall. Between the lamina and the wall, a pocket 22 is delimited that is parallel to the respective internal wall 11. In one embodiment, such lamina may also be part of a box-like structure of a respective electrical heating element 20 which projects into the chamber 13 through an opening suitably made in the internal wall 11. In other words, the box-like structure of the electrical heating element 20 is inserted through said opening and occludes it, allowing the lamina and the pocket 22 to project into the chamber 13. Each pocket 22 is arranged immediately below a respective series of holes 19.

The apparatus 1 comprises baffles 23 and/or closing elements 24 mounted on the internal walls 11 and near the openings 19. In particular, both the baffles 23 and the closing elements 24 are mounted/hooked in a removable way in the pockets 22, so as to be able to easily mount, remove or substitute them, change position, optionally manually and without the use of tools. The pocket 22 is configured for housing a portion of one of the baffles 23 or of one of the closing elements 24.

Said portion of the baffle 23 or of the closing element 24 is slidably insertable in the pocket or slidably removable from the pocket in a manual manner.

The baffles 23 are configured to divert the heated fluid leaving the openings 19 and the closing elements 24 are configured to obstruct some of said openings 19.

The apparatus 1 comprises a kit with a number of baffles 23 and/or of closing elements 24 higher than the number of the pockets 22 arranged on the internal walls 11. The baffles 23 and/or the closing elements 24 are also of different types, i.e. they have different shapes. The baffles 23 and/or the closing elements 24 are selected from among those of the kit as a function of the shape and/or of the size of the glove 4 to be treated. In other words, the baffles 23 and the closing elements 24 are replaceable so to be able to change the conditions of the flow of heated fluid in the chamber 13.

Figure 5A:
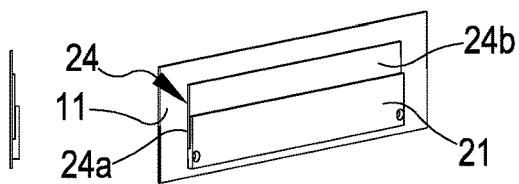
FIGS. 5A-5H illustrate variants of respective elements of the apparatus pursuant to the preceding figures.
Figure 5B:
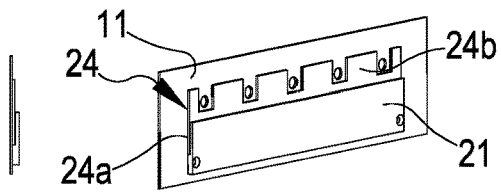

Each of the closing elements 24 comprises a plate occluding, when the closing element 24 is associated with the respective wall 11, at least one of the openings 19. FIGS. 5A and 5B illustrate, as an example, two types of closing elements 24.

The closing element 24 of FIG. 5A has a portion 24a slidably inserted in the pocket 22 and a portion 24b which covers and closes all the openings 19 of a series. The closing element 24 of FIG. 5A has the portion 24a slidably inserted in the pocket 22 and a serrated portion 24b which covers and closes only some of the openings 19 (more precisely open/closed in alternation).

Each of the baffles 23 comprises a plate projecting, when the baffle 23 is associated with the respective wall 11, within the chamber 13.

FIGS. 5C-5H as an example illustrate six types of baffles 23.

Figure 5C:
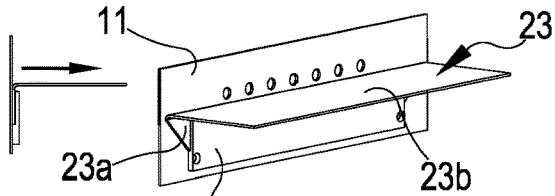
Figure 5D:
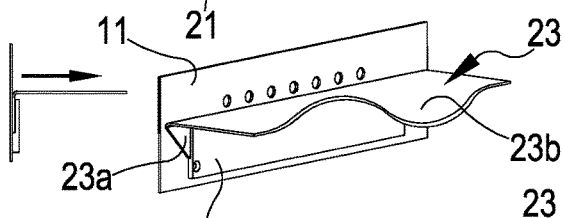
Figure 5E:
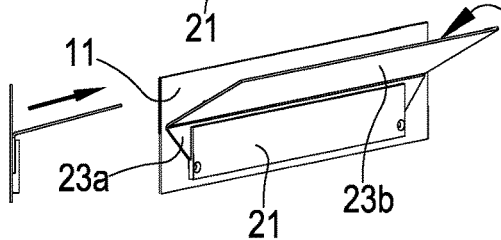
Figure 5F:
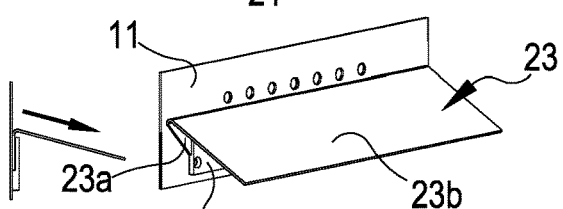
Figure 5G:
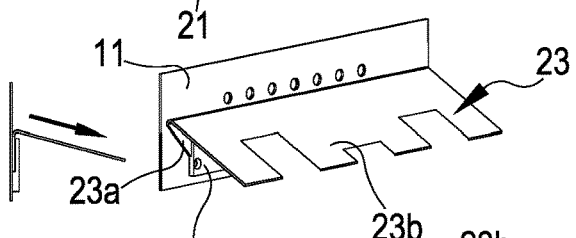
Figure 5H:
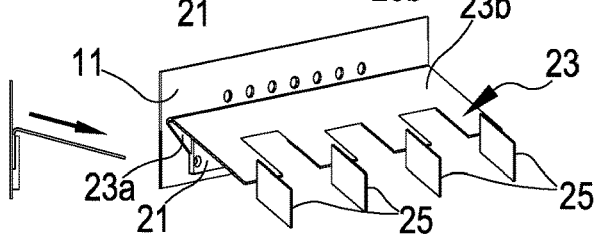

The baffle 23 of FIG. 5C is defined by a folded plate and has a portion 23a slidably inserted in the pocket 22 and a portion 23b which projects into the chamber 13, is flat and is extended perpendicular with respect to the wall 11. The projecting portion 23b of the baffle 23 of FIG. 5D is undulated, i.e. it does not lie in a single plane. The projecting portion 23b of the baffle 23 of FIG. 5E is flat and is tilted upward. The projecting portion 23b of the baffle 23 of FIG. 5F is flat and is tilted downward. The projecting portion 23b of the baffle 23 of FIG. 5G is flat, is tilted downward and has a serrated end edge. The projecting portion 23b of the baffle 23 of FIG. 5H is flat, is tilted downward and has a serrated end edge. The baffle 23 of FIG. 5H is also provided with tabs 25 placed on the end edge and perpendicular with respect to the projecting portion 23b.

In other embodiments, not illustrated, only one suitably-shaped plate may include both a baffle 23 and also a closing element 24.

Figure 2:
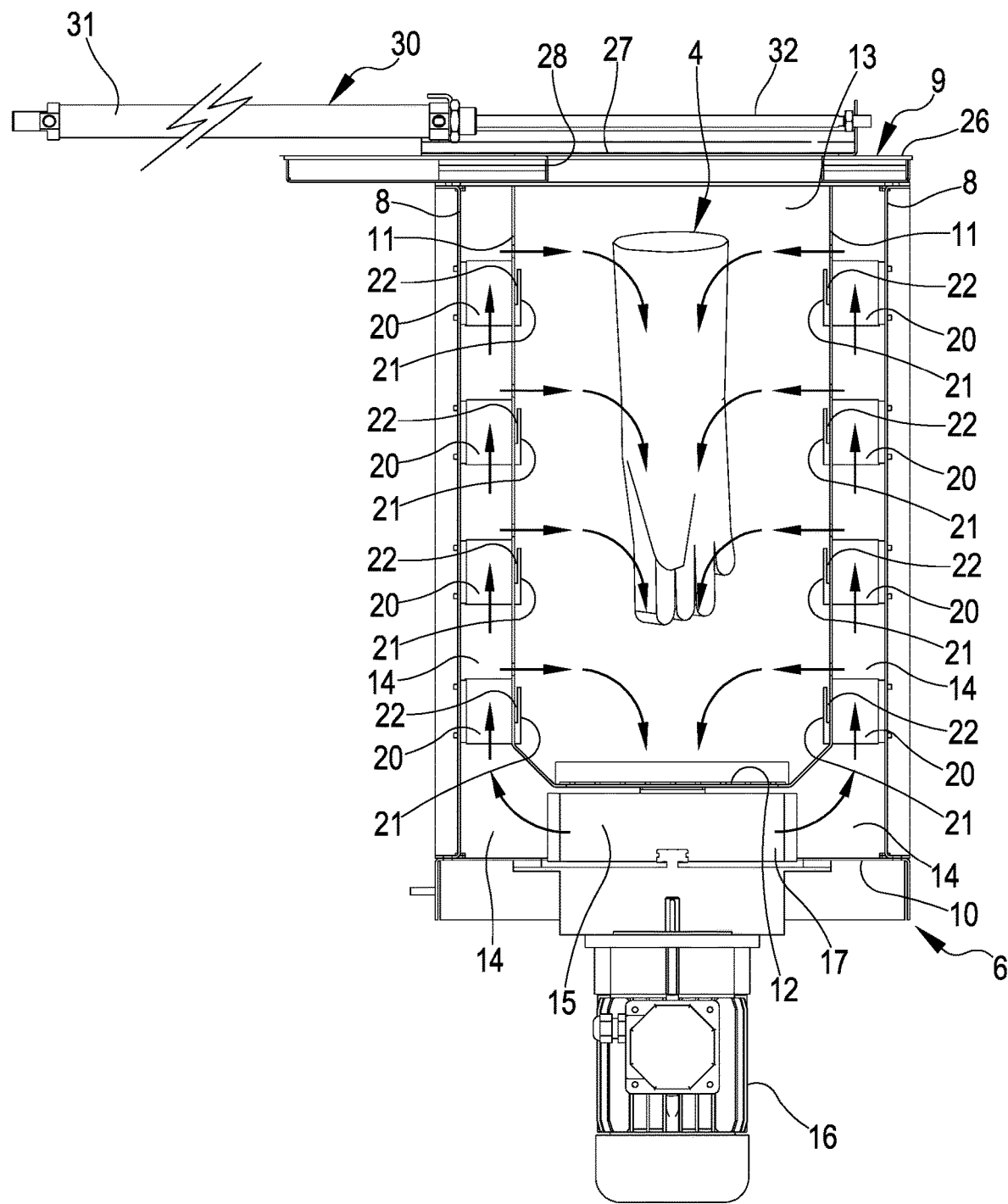
FIG. 2 is a sectional view of an oven forming part of the apparatus of FIG. 1.
Figure 4:
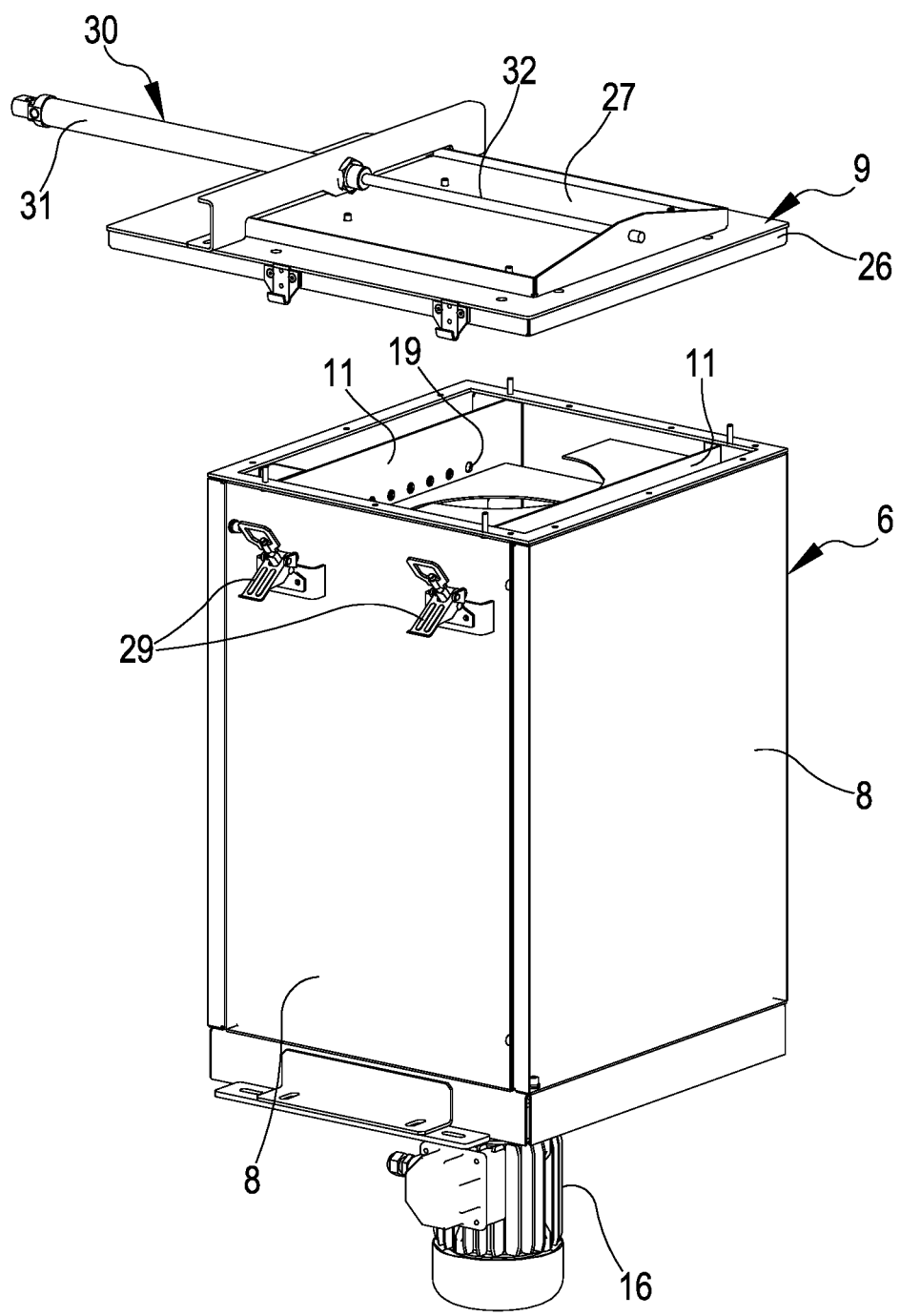
FIG. 4 is a different view of the oven of FIG. 2.

The upper wall 9 of the oven 6 comprises a framework 26 and a door 27 mounted on the framework 26 (FIGS. 2, 3 and 4). The framework 26 internally delimits a passage 28 recloseable by means of the door 27 (FIGS. 2 and 3). The framework 26 is mounted in a removable way on the remaining structure of the oven 6 by means of hooks 29 with quick release of manual type (FIG. 4). An actuator 30, e.g. electric or pneumatic, is mounted on the framework 26 and is connected to the door 27. In the illustrated embodiment, the actuator 30 comprises a cylinder 31 integrally mounted on the framework 26 and a stem 32 movable with respect to the cylinder 31 and connected to the door 27. The door 27 is made to slide by the actuator 30 with respect to the framework 26 between a closed position of the passage 28 and an open position of said passage 28.

The door 26 allows inserting or removing the glove 4 into/from the oven 6. The complete removal of the framework 26 instead allows an operator to access the chamber 13 (i.e. insert hands and arms therein) in order to execute the maintenance and/or in order to act on the baffles 23 and/or on the closing elements 24 (e.g.: removing them, mounting them, substituting them, etc.). Once the framework 26 is removed, the passage is wide enough to allow easily removing from or inserting in the chamber 13 the baffles 23 and/or the closing elements 24.

The support head 7 is mounted on a vertical guide 33 and is connected to a motor 34, e.g. a pneumatic cylinder, which allows moving the support head 7 along the vertical guide 33 between a first lifted position, in which it maintains the glove 4 outside the chamber 13, and a second lowered position, in which it maintains the glove 4 inside the chamber 13.

Figure 6:
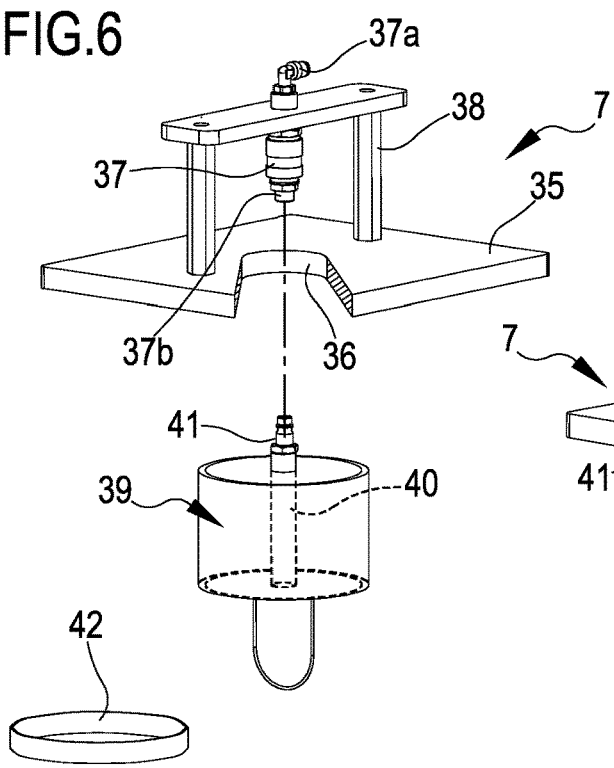
FIG. 6 is an exploded view of an assembly of elements of the apparatus associable with a glove.

The support head 7, better visible in FIGS. 6 and 7, comprises a cover 35 defined by a rectangular panel provided with a central hole 36. The support head 7 also comprises a quick coupling device 37 supported by a framework 38 mounted above the cover 35. The framework 38 comprises a crosspiece supported by two uprights. The quick coupling device 37 is a connector provided with an internal duct configured for being traversed by a fluid. The quick coupling device 37 has a first end 37a stably connected to a pipe, not illustrated, in turn connected to a pressurized air source (such as a tank and/or a compressor) and a second free end 37b provided with mechanical quick coupling devices, not illustrated in detail. The quick coupling device 37 may be provided with a check valve. The second end 37b of the quick coupling device 37 faces or is partially inserted in the central hole 36 of the cover 35. There is a double function of the quick coupling device 37: supporting the glove 4 and introducing pressurized air into the glove 4, as will be illustrated hereinbelow.

The apparatus 1 comprises a plurality of plugs 39. One of such plugs 39 is illustrated in FIGS. 1, 6 and 7. The illustrated plug 39 has a cylindrical shape and has a through duct 40 which axially traverses it. The through duct 40 is opened both on a first end/face and on a second end/face of the plug 39. A quick coupling 41, configured for being coupled (hooked and unhooked) to the quick coupling device 37 of the head 7, is arranged on the first end/face of the plug 39 and partly delimits the abovementioned through duct 40. A check valve, not illustrated, is present in the through duct 40, for example this is part of the quick coupling 41.

The size of the plug 39 is such to allow fitting the open end of the glove 4 on said plug 39 according to that illustrated in FIGS. 6 and 7. The apparatus 1 may therefore be provided with plugs 39 with size and/or shapes that are different as a function of the gloves 4 to be worked.

A fixing ring 42 is configured for being arranged and closed around the plug 39 and the open end of the glove 4 when said open end is fit on the plug 39 so as to retain the glove 4 on the plug 39 (as in FIGS. 1 and 7).

The apparatus 1 is also provided with an electronic control unit (with memories, processors, input/output devices, etc.), not illustrated, operatively connected to the motor 16 of the fan 15, to the actuator 30 of the door 27, to the motor 34 of the support head 7, to the electrical heating elements 20, to the pressurized air source and to suitable sensors and is configured for driving/controlling such elements and the overall operation of the apparatus 1. In the illustrated embodiment, the apparatus 1 also comprises a touch-screen 43 connected to the control unit. The touch-screen 43 allows the operator to program the work cycles and to monitor the operation thereof.

During use and in accordance with the process for thermo-adhesive bonding according to the present invention, as a function of the shape and/or of the size of the type of gloves 4 to be worked, the operator removes the upper wall 9 of the oven 6, mounts the suitable baffles 23 and/or closing elements 24 in the oven 6 and then reassembles said upper wall 9.

For each glove 4, it is provided to insert, e.g. manually, the internal impermeable liner 2 in the main portion 3. The internal impermeable liner 2 is provided with a plurality of thermo-adhesive points or with a thermo-adhesive layer which remains interposed between said internal impermeable liner 2 and said main portion 3 once the liner 2 is inserted in the external portion 3. In embodiment variants not described in detail, the thermoplastic or thermoadhesive elements are part of the liner and/or of the main portion. The liner 2 and the main portion 3 are then temporarily joined at some zones/points, e.g. by heating said zones/points.

Subsequently, it is provided to fit the open end of the glove 4 on the plug 39, to lock the glove 4 on the plug 39 by means of the fixing ring 42 and to partially inflate the glove 4 arranged on the plug 39, by introducing pressurized air through the quick coupling 41. Such inflation may occur by means of known devices, not described herein, and before associating the plug 39 with the glove 4 to the support head 7 of the apparatus 1. Due to the check valve present in the through duct 40 and to the air impermeability of the liner 2, the glove 4 remains inflated.

While the support head 7 is in the first lifted position thereof, the quick coupling 41 is connected to the quick coupling device 37, by making it pass through the central hole 36 of the cover 35 and by abutting the first end of the plug 39 against a lower surface of said cover 35. In this manner, the plug 39 with the glove 4 are hung from the support head 7 and above the oven 6. In addition, the duct 40 is connected to the pressurized air source.

In a manual or automatic manner, the apparatus 1 provides to open the door 27 and to carry the support head 7 into the second position so as to insert the glove 4 in the chamber 13 through the passage 28. In such second position, the cover 35 of the support head 7 closes the passage 28 and isolates the chamber 13 from the outside while the plug 39 and the glove 4 are hung inside said chamber 13 and are maintained fixed with respect to the walls 11, to the baffles 23 and to the closing elements 24 of the oven 6 (FIG. 2).

At this point, the fan 15 and the heating elements 20 are activated so as to circulate hot air in the chamber 13 and around the glove 4. The baffles 23 and/or the closing elements 24 selected and mounted are configured to uniformly distribute the heated air on the glove 4 and to reach a same temperature and for a same time in all the zones of said glove 4.

According to one embodiment of the process, the heating occurs in two steps: a step of pre-heating and a step of heating.

In the step of pre-heating, the circulating air is heated and maintained at a pre-heating temperature $T_{preris}$, e.g. comprised between 100° C. and 150° C., for a pre-heating time $t_{preris}$ for example comprised between 7 s and 10 s. In this step, a pre-heating over-pressure $P_{preris}$ (with respect to the external ambient pressure) inside the glove 4 is for example comprised between 0.01 bar and 0.05 bar. This step allows bringing to a viscous state the plurality of thermo-adhesive points or the thermo-adhesive layer.

In the subsequent heating step, the circulating air is brought to a heating temperature $T_{ris}$ for example higher than that of pre-heating, e.g. comprised between 150 C.° and 200° C. for a heating time $t_{ris}$ for example greater than the pre-heating time $t_{preris}$, e.g. comprised between 10 s and 15 s. In this step, a heating over-pressure $p_{ris}$ (with respect to the external ambient pressure) inside the glove 4 is for example higher than the pre-heating pressure $P_{preris}$ and is for example comprised between 0.05 bar and 1 bar. In this step, the thermo-adhesive layer or the points melt once the melting temperature thereof has been reached.

According to one embodiment, towards the end of the heating step and before removing the glove 4 from the oven 6, it is provided to further increase the over-pressure for a brief instant, always by means of the pressurized air source, so as to place under tension the internal impermeable liner 2 and the external main portion 3 of the glove 4 and to uniformly press said internal impermeable liner 2 against said external main portion 3.

The glove 4 is then removed from the oven 6 by moving the support head 7 into the first position. The plug 39 is disconnected from the support head 7 and the glove 4 is left to cool while it is still arranged on the plug 39 with over-pressure at its own interior. This allows the thermo-adhesive layer or points to cross-link and hence to stably join via thermo-adhesive bonding the internal impermeable liner 2 with the external main portion 3 of the glove 4. The glove-cap assemblies removed one after the other from the oven 6 or from multiple ovens 6 can be left to cool in ambient conditions, for example by arranging them on a support framework provided with quick coupling devices 37 similar or identical to those of the support head 7. In an embodiment variant, each glove 4 is left to cool in the oven after having deactivated the heating elements 20. In a different embodiment variant, the glove 4 is made to cool by placing it in a suitable refrigeration chamber, not illustrated.

In addition, during the heating cycle in the oven 6, the temperature of the air in the chamber 13 and/or the over-pressure in the glove 4 and/or a flow rate of the air in the chamber 13 may be varied as a function of the specific requirements.

In an embodiment variant of the apparatus 1, not illustrated, the baffles 23 and/or the closing elements 24 are mounted on the internal walls 11 such that they may be oriented and/or moved with suitable constraining systems, such as guides and/or hinges. Such baffles 23 and/or closing elements 24 may, for example, be moved by means of respective actuators/motors driven through the control unit and the touch-screen 43.

In one embodiment variant of the apparatus 1, not illustrated, in place of air, a different fluid may be used in the chamber 13 such as vapor or a mixture of air and vapor.

The apparatus 1 described in detail carries out the function of joining elements of a glove 4 via thermo-adhesive bonding, but an apparatus 1 according to the invention may also be used for thermoforming flexible semi-finished products, such as woven or nonwoven fabrics comprising thermoplastic yarns.

The invention claimed is:

1. An apparatus for thermo-forming and/or thermo-adhesive bonding of semi-finished products,
   wherein the apparatus is configured for heating semi-finished products provided with thermo-plastic or thermo-adhesive elements, so as to determine an at least partial melting and a subsequent cross-linking of thermoplastic polymers of said thermo-plastic or thermo-adhesive elements, and
   wherein the apparatus comprises:
   an oven having walls delimiting a chamber configured to house at least one semi-finished product, the walls comprising a pair of lateral internal walls extending vertically on opposite sides of the chamber;
   devices for generating a flow of heated fluid in the chamber, wherein at least one of the lateral internal walls of the oven has a plurality of openings in fluid communication with said devices; and
   baffles and closing elements mounted on a face of the at least one of the lateral internal walls near at least some of the plurality of openings;
   wherein the baffles are configured to divert the heated fluid leaving the plurality of openings into the chamber and wherein the closing elements are configured to obstruct some of said openings,
   wherein the baffles and the closing elements are replaceable, in order to change conditions of the flow of the heated fluid in the chamber,
   wherein the apparatus further comprises a plurality of coupling elements arranged on the face of the at least one of the lateral internal walls and wherein the baffles and the closing elements are hooked in a removable way to said coupling elements,
   wherein each of the coupling elements comprises a lamina arranged parallel to the face of the at least one of the lateral internal walls, the lamina defining a pocket configured for housing a portion of the baffle or the closing element, and
   wherein the portion of the baffle or of the closing element is slidably insertable in the pocket or slidably removable from the pocket.

2. The apparatus according to claim 1, wherein each pocket is arranged immediately below a respective series of openings.

3. The apparatus according to claim 2, wherein each set of parallel, lateral external and lateral internal walls defines a space therebetween, such that the flow of heated fluid is passed through the space and out through the plurality of openings in the respective lateral internal wall into the chamber.

4. The apparatus according to claim 1, wherein the walls comprise a pair of lateral external walls, a respective wall of the pair of lateral external walls extending parallel to a corresponding wall of the pair of lateral internal walls, on opposite sides of the chamber.

5. The apparatus according to claim 1, wherein each baffle is defined by a folded plate, wherein the portion of the baffle intended to be inserted in the pocket and a portion of the baffle projecting in into the chamber are respective portions of said folded plate.

6. The apparatus according to claim 5, wherein the portion of the baffle projecting in into the chamber is flat or undulated and is configured to project perpendicular to the face of the at least one of the lateral internal walls.

7. The apparatus according to claim 1, wherein each closing element is defined by a plate insertable in the pocket.

8. The apparatus according to claim 7, wherein each closing element has a serrated edge configured for closing one or more holes when the closing element is housed in the respective pocket.

9. The apparatus according to claim 1, wherein each pocket extends parallel to the respective wall.

10. The apparatus according to claim 1, comprising:
    a main frame configured to rest on a ground surface and to support the oven; and
    a support head mounted on the main frame and configured to support a semi-finished product, wherein the support head is movable with respect to the main frame between a first position, in which it maintains the semi-finished product outside the chamber, and a second position, in which it maintains the semi-finished product inside the chamber.

11. The apparatus according to claim 10, wherein one of the walls has a passage and a door movable between a closed position of the passage and an open position of the passage.

12. The apparatus according to claim 11, wherein the support head is configured for inserting the semi-finished product into the chamber through said passage when the door is in the open position.

13. The apparatus according to claim 10, wherein an upper wall has a passage and a door movable between a closed position of the passage and an open position of the passage; and wherein the support head is configured for inserting the semi-finished product in the chamber through said passage when the door is in the open position.

14. The apparatus according to claim 13, comprising an actuator operatively connected to the door and configured for moving said door between the closed position and the open position.

15. The apparatus according to claim 13, wherein the support head comprises a cover configured for closing said passage when the door is in the open position and the support head is in a second position.

16. The apparatus according to claim 10, wherein the support head comprises a quick coupling device configured for being hooked to and unhooked from the semi-finished product; and wherein, when the support head is hooked to the semi-finished product, said semi-finished product is hung below the support head.

\* \* \* \* \*